United States Patent
Doan et al.

(10) Patent No.: US 9,944,285 B2
(45) Date of Patent: Apr. 17, 2018

(54) HYBRID VEHICLE AND LASH MITIGATION STRATEGY

(71) Applicant: FORD GLOBAL TECHNOLOGIES, LLC, Dearborn, MI (US)

(72) Inventors: Jacob Doan, Royal Oak, MI (US); Shunsuke Okubo, Belleville, MI (US); Carol Louise Okubo, Belleville, MI (US); Benjamin Nault, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/061,271

(22) Filed: Mar. 4, 2016

(65) Prior Publication Data
US 2017/0253244 A1    Sep. 7, 2017

(51) Int. Cl.
*B60T 8/32* (2006.01)
*B60W 30/18* (2012.01)
*B60W 20/00* (2016.01)
*F16H 3/72* (2006.01)

(52) U.S. Cl.
CPC ...... *B60W 30/18036* (2013.01); *B60W 20/00* (2013.01); *B60W 2710/105* (2013.01); *B60W 2710/1055* (2013.01); *B60W 2720/106* (2013.01); *B60Y 2300/188* (2013.01); *F16H 3/725* (2013.01)

(58) Field of Classification Search
USPC .......................................................... 701/93
See application file for complete search history.

(56) References Cited

U.S. PATENT DOCUMENTS

| | | | |
|---|---|---|---|
| 5,368,120 A * | 11/1994 | Sakai | B60K 17/356 180/197 |
| 6,574,535 B1 | 6/2003 | Morris et al. | |
| 7,315,774 B2 * | 1/2008 | Morris | B60K 1/02 701/53 |
| 7,803,087 B2 | 9/2010 | Okubo et al. | |
| 8,332,111 B2 | 12/2012 | McDonnell et al. | |
| 8,954,215 B2 | 2/2015 | Yamazaki et al. | |
| 2008/0257619 A1 * | 10/2008 | Yamazaki | B60K 6/44 180/65.265 |
| 2013/0297110 A1 * | 11/2013 | Nefcy | B60L 15/20 701/22 |
| 2013/0297111 A1 * | 11/2013 | Yamazaki | B60W 20/00 701/22 |
| 2014/0309894 A1 * | 10/2014 | Li | F16H 57/12 701/51 |

* cited by examiner

*Primary Examiner* — Tyler Paige
(74) *Attorney, Agent, or Firm* — David Kelley; Brooks Kushman P.C.

(57) ABSTRACT

A drivetrain system includes a controller that is programmed to, in a presence of a request for increased drivetrain torque that results in reversal of drivetrain torque direction, command an increase in drivetrain torque at a reduced rate while a value that is based on drivetrain speed difference remains within a predetermined range absent a braking torque request exceeding a threshold. The controller is further programmed to command the increase at an accelerated rate upon the braking torque request exceeding the threshold.

15 Claims, 5 Drawing Sheets

HYBRID VEHICLE AND LASH MITIGATION STRATEGY

TECHNICAL FIELD

This disclosure relates to hybrid/electric vehicles and mitigating disturbances caused by lash within a drivetrain.

BACKGROUND

Audible and tactile clunks may occur within a vehicle drivetrain during transient torque events. These clunks may be caused by lash in the mechanical couplings (such as gears, splines, or u-joints) of the drivetrain.

SUMMARY

A drivetrain system includes a controller that is programmed to, in a presence of a request for increased drivetrain torque resulting in reversal of drivetrain torque direction, command an increase in drivetrain torque at a reduced rate while a value that is based on a drivetrain speed difference remains within a predetermined range absent a braking torque request exceeding a threshold. The controller is further programmed to command the increase at an accelerated rate upon the braking torque request exceeding the threshold.

A controller includes input channels, output channels, and control logic. The input channels are configured to receive parameters indicative of a drivetrain speed difference and requests for drivetrain torque. The output channels are configured to provide commands to increase drivetrain torque. The control logic is programmed to, in a presence of a request for increased drivetrain torque that results in reversal of drivetrain torque direction, generate a command to increase drivetrain torque at a reduced rate so long as a value that is based on the drivetrain speed difference remains within a predetermined range absent the request for increased drivetrain torque exceeding a threshold. The control logic is further programmed to generate a command to increase drivetrain torque at an accelerated rate upon the request for increased drivetrain torque exceeding the threshold.

A method of controlling a vehicle includes, increasing a drivetrain torque at a reduced rate in response to a request for increased drivetrain torque resulting in a reversal of drivetrain torque direction while a value that is based on a drivetrain speed difference remains within a predetermined range, and increasing the drivetrain torque at an accelerated rate upon the expiration of the predefined time limit while the drivetrain speed difference remains within the predetermined range.

DETAILED DESCRIPTION

Figure 1:
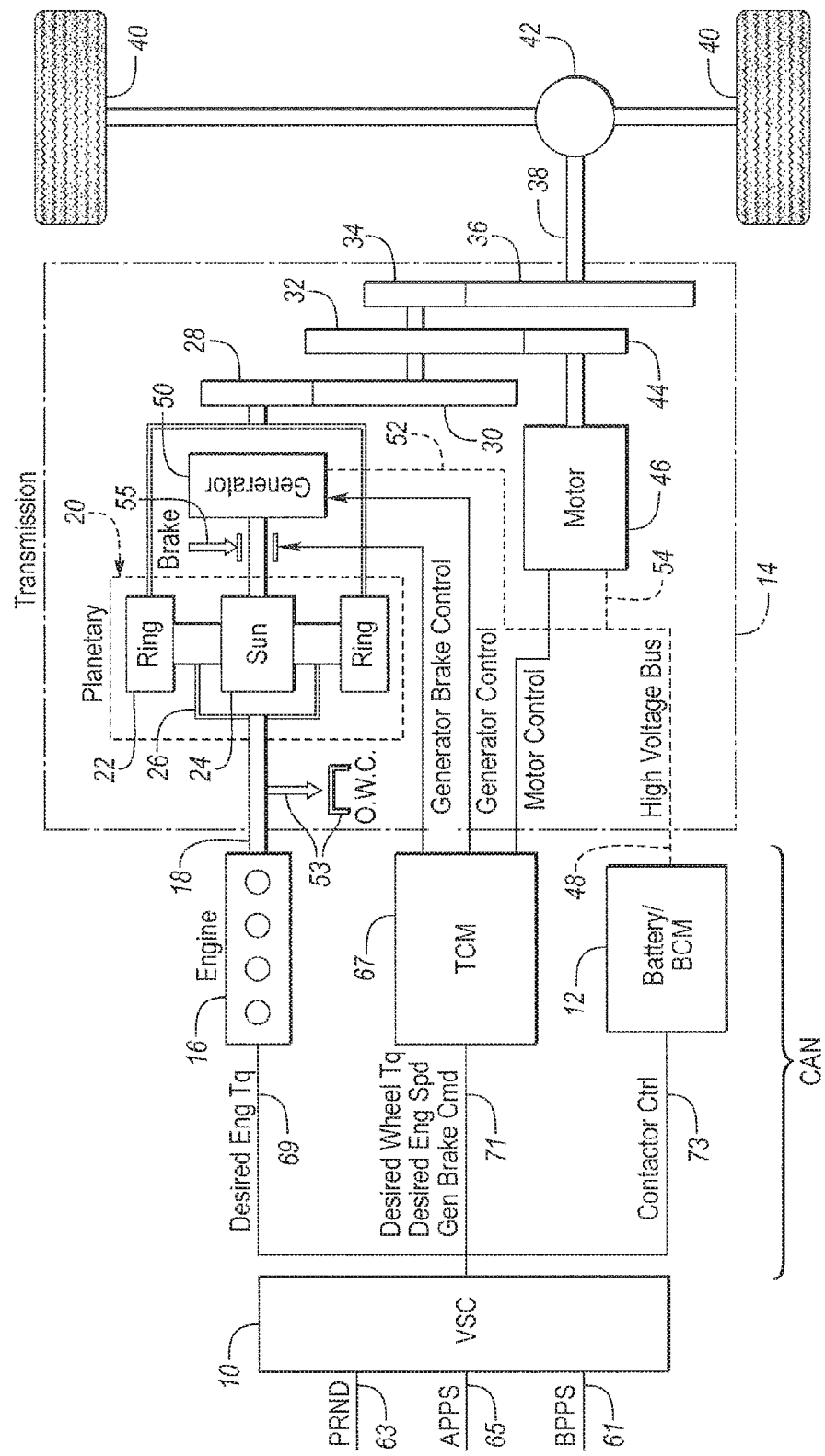
FIG. 1 is a schematic diagram illustrating a representative hybrid vehicle having a power-split powertrain.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

One class of hybrid electric vehicle powertrains, commonly referred to as a power-split powertrain, has two sources of power. The first source includes an internal combustion engine, and the second source includes a combination of an electric motor, a generator and a battery. The engine and the generator, together with a planetary gear set, a countershaft and a motor, establish a mechanical torque flow path and an electromechanical torque flow path to vehicle traction wheels. The battery is an energy-storing device for the generator and the motor. Engine power is divided into two power flow paths at any generator speed and vehicle speed. Engine speed is controlled by the generator speed, which implies that the engine speed can be decoupled from the vehicle speed within the allowed speed range of the generator. The mode of operation when the generator is generating electrical power using the mechanical power input from the engine is called "positive power split."

Because of the mechanical properties of the planetary gear set, the generator can distribute power to the planetary gear set to drive the vehicle. This mode of operation is called "negative power split". The combination of a generator, a motor and a planetary gear set thus can be considered to have electrical continuously variable (e-CVT) transmission characteristics.

A generator brake can be activated so that engine output power is transmitted with a fixed gear ratio to the torque output side of the powertrain through a mechanical path only. The first power source can only affect forward propulsion of the vehicle since there is no reverse gear. The engine requires either generator control or application of a generator brake to transmit output power for forward drive.

When the second power source is active, the electric motor draws power from the battery and drives the vehicle independently of the engine for both forward drive and reverse drive. The motor may also generate power and charge the battery if the engine produces power exceeding driver demand, or in a regenerative mode capturing vehicle kinetic energy. In addition, the generator can draw power from the battery and drive against a one way clutch on the engine power output shaft to propel the vehicle in a forward direction. This mode of operation is called "generator drive mode". A vehicle system controller coordinates the two power sources so that they work together seamlessly to meet a driver's torque demand without exceeding powertrain system limits. The vehicle system controller allows continuous regulation of engine speed for any given vehicle speed and power request. The mechanical power flow path provides efficient power delivery through the planetary gear set to the driveshaft.

Referring to FIG. 1, a hybrid electric vehicle having a power-split (or series-parallel) powertrain is illustrated. The powertrain includes two power sources that are connected to the drivetrain: (1) an engine 16 and an electric-machine 50 (which may be referred to as a generator) connected together via a planetary gear arrangement 20; and (2) an electric drive system including a battery 12, an electric-machine 46 (which may be referred to as a motor) and generator 50. Battery 12 is an energy storage system for motor 46 and generator 50.

A vehicle system controller (VSC) 10 is configured to send control signals to and receive sensory feedback information from one or more of the battery 12, engine 16, motor 46, and generator 50 for power to be provided to vehicle traction wheels 40 for propelling the vehicle. Controller 10 controls the power source proportioning between battery 12 and engine 16 for providing power to propel the vehicle and thereby controls the state of charge (SOC) of battery 12.

While illustrated as one controller, the controller 10 may be part of a larger control system and may control or may be controlled by various other controllers throughout the vehicle. It should therefore be understood that the controller 10 and one or more other controllers can collectively be referred to as a "controller" that controls various actuators in response to signals from various sensors to control functions such as starting/stopping engine 16, operating the motor 46 or generator 50 to provide wheel torque or charge the battery 12, etc. Controller 10 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling various components of the vehicle.

Transmission 14 includes planetary arrangement 20, which includes a ring gear 22, a sun gear 24, and a carrier assembly 26. Ring gear 22 distributes torque to step ratio gears comprising meshing gear elements 28, 30, 32, 34, and 36. A torque output shaft 38 of transmission 14 is driveably connected to wheels 40 through a differential-and-axle mechanism 42. Gears 30, 32, and 34 are mounted on a counter shaft 31 with gear 32 engaging a motor-driven gear 44. Motor 46 drives gear 44. Gear 44 acts as a torque input for counter shaft 31. Engine 16 distributes torque through input shaft 18 to transmission 14. The battery 12 delivers electric power to the motor 46 through power flow path 48. The generator 50 is connected electrically to battery 12 and to motor 46, as shown at 52.

While the battery 12 is acting as a sole power source with engine 16 off, input shaft 18 and carrier assembly 26 are braked by an overrunning coupling (i.e., one-way clutch (OWC)) 53. A mechanical brake 55 anchors the rotor of the generator 50 and sun gear 24 when the engine 16 is on and the powertrain is in a parallel drive mode, the sun gear 24 acting as a reaction element.

The controller 10 receives a signal PRND (park, reverse, neutral, drive) from a transmission range selector 63, which is distributed to transmission control module (TCM) 67, together with a desired wheel torque, a desired engine speed, and a generator brake command, as shown at 71. A battery switch 73 is closed after vehicle "key-on" startup. The controller 10 issues a desired engine torque request to engine 16, as shown at 69, which is dependent on accelerator pedal position sensor (APPS) output 65. A brake pedal position sensor (BPPS) distributes a wheel brake signal to the controller 10, as shown at 61. A brake system control module (not shown) may issue to the controller 10 a regenerative braking command based on information from the BPPS. The TCM 67 issues a generator brake control signal to the generator brake 55. The TCM 67 also distributes a generator control signal to the generator 50.

Figure 2:
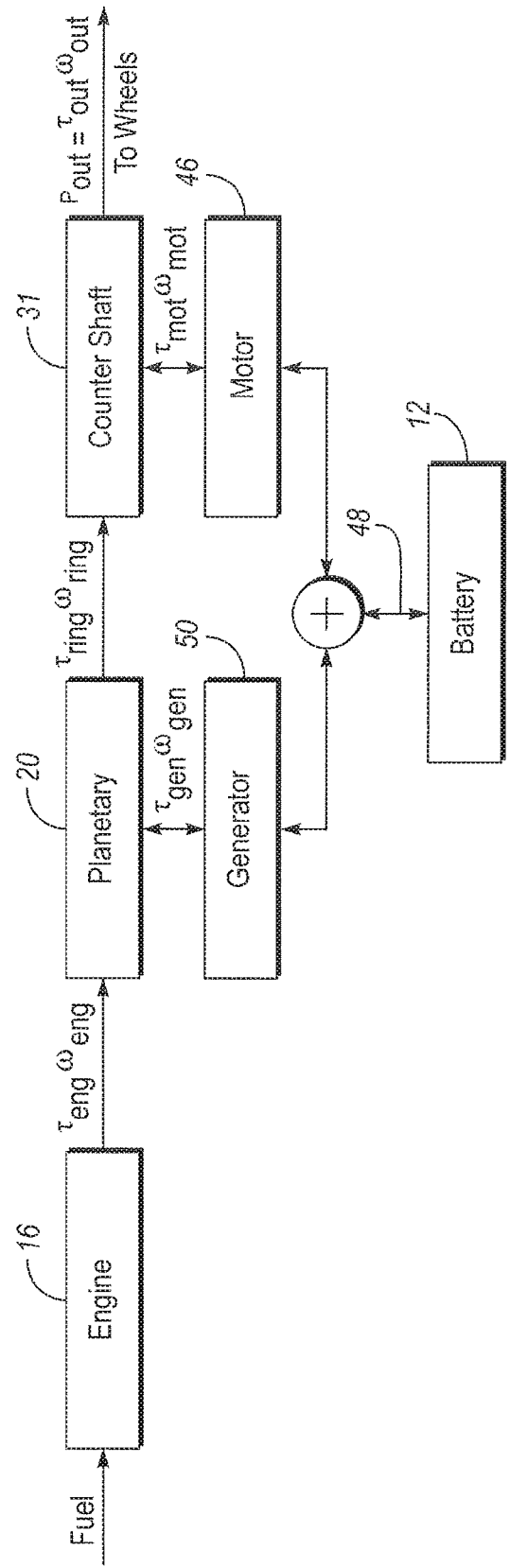
FIG. 2 is a schematic diagram illustrating torque and speed transmission through a power-split powertrain.

Referring to FIG. 2, a block diagram of power flow paths between the various components of the powertrain of FIG. 1 is shown. Fuel is delivered to the engine 16 under the control of the driver using an engine throttle. The engine 16 delivers engine power ($\tau_{eng}\omega_{eng}$, where $\tau_{eng}$ is engine torque and $\omega_{eng}$ is engine speed) to the planetary gear arrangement 20. The planetary gear arrangement 20 delivers power ($\tau_{ring}\omega_{ring}$, where $\tau_{ring}$ is the ring gear torque and $\omega_{ring}$ is the ring gear speed) to the counter shaft 31. The output shaft 38 outputs power ($P_{out}=\tau_{out}\omega_{out}$, where $\tau_{out}$ and $\omega_{out}$ are the torque and speed of output shaft 38, respectively) to the wheels 40. The generator 50 can deliver power to or be driven by planetary gear arrangement 20. Similarly, power distribution between the motor 46 and the counter shaft 31 can be distributed in either direction. Driving power from the battery 12 or charging power to battery 12 is represented by the bi-directional arrow 48.

The engine output power ($\tau_{eng}\omega_{eng}$) can be split into a mechanical power flow path ($\tau_{ring}\omega_{ring}$) and an electrical power flow path ($\tau_{gen}\omega_{gen}$ to $\tau_{mot}\omega_{mot}$, where $\tau_{gen}$ is the generator torque, $\omega_{gen}$ is the generator speed, $\tau_{mot}$ is the motor torque, and $\omega_{mot}$ is the motor speed). In this so-called positive split mode of operation, the engine 16 delivers power to the planetary gear arrangement 20 which delivers power ($\tau_{ring}\omega_{ring}$) to the counter shaft 31 which in turn drives the wheels 40. A portion of the planetary gearing power ($\tau_{gen}\omega_{gen}$) is distributed to the generator 50, which delivers charging power to the battery 12. The battery 12 drives the motor 46, which distributes power ($\tau_{mot}\omega_{mot}$) to counter shaft 31.

If the generator brake 55 is activated, a parallel operating mode is established. In the parallel operating configuration, the engine 16 is on and the generator 50 is braked. The battery 12 powers the motor 46, which powers counter shaft 31 simultaneously with delivery of power from the engine 16 to the planetary gear arrangement 20 to the counter shaft 31. During operation with the second power source (described as including battery 12, motor 46, and generator 50), the motor 46 draws power from the battery 12 and provides propulsion independently from engine 16 to the drivetrain. The drivetrain includes the components of the powertrain that deliver power from the engine 16, generator 50, or motor 46 to the wheels 40, including any shafts (e.g., output shaft 38), gears (e.g., planetary gear 20), differentials 42, or any other component disposed between a power source (e.g., engine 16 or motor 46) and the wheels 40 that delivers power to the wheels.

As described, the hybrid vehicle has two power sources for delivering driving power to the wheels 40. The first power source includes the engine 16 and the second power source includes the battery 12. The engine 16 and the battery 12 can provide traction power either simultaneously or independently. The controller 10 controls the electric energy and fuel energy proportioning to meet the propulsion requirements and thereby controls the engine 16 and the battery 12 accordingly.

As may be observed, the planetary gearing arrangement 20 imposes speed and torque relationships among the engine 16, generator 50, and the vehicle traction wheels 40. As discussed above, the generator 50 may be controlled to transfer power from the engine 16 to vehicle traction wheels 40 using the planetary gearing arrangement 20 as a CVT. However, at some operating conditions, the losses incurred by operating the generator 50 exceed the energy benefit of the CVT.

As an example, when the vehicle is in "steady state" operation, such as cruising at a generally constant speed, the generator 50 incurs operational losses while the gear ratio between the engine 16 and traction wheels 40 remains generally unchanged. Here, steady state operation refers to a constant vehicle speed, constant driver power request, and generally consistent quantity of engine power used to charge the vehicle. This generally occurs when the driver power demand is roughly the same as the "road load", or the sum of forces acting on the vehicle (e.g. rolling resistance, aerodynamic drag, etc.).

Clunks may be caused by mechanical couplings within the drivetrain of the vehicle during tip-ins, tip-outs, or brake applications. The relevant couplings may include the couplings between the motor 46 and the wheels 40, and the couplings between the planetary gearing arrangement 20 and the wheels 40. When torque is reversed in the powertrain, lash causes the mechanical connections in the drivetrain to disengage then reengage in the opposite direction. This is called lash crossing. If this lash crossing transition happens too quickly or abruptly, there may be a noise, vibration, and harshness (NVH) disturbance when the couplings re-engage. Lash may refer to clearance or lost motion in a mechanism caused by gaps between the mating parts (i.e., the couplings between the motor 46 and the wheels 40, and the couplings between the planetary gearing arrangement 20 and the wheels 40).

Figure 3:
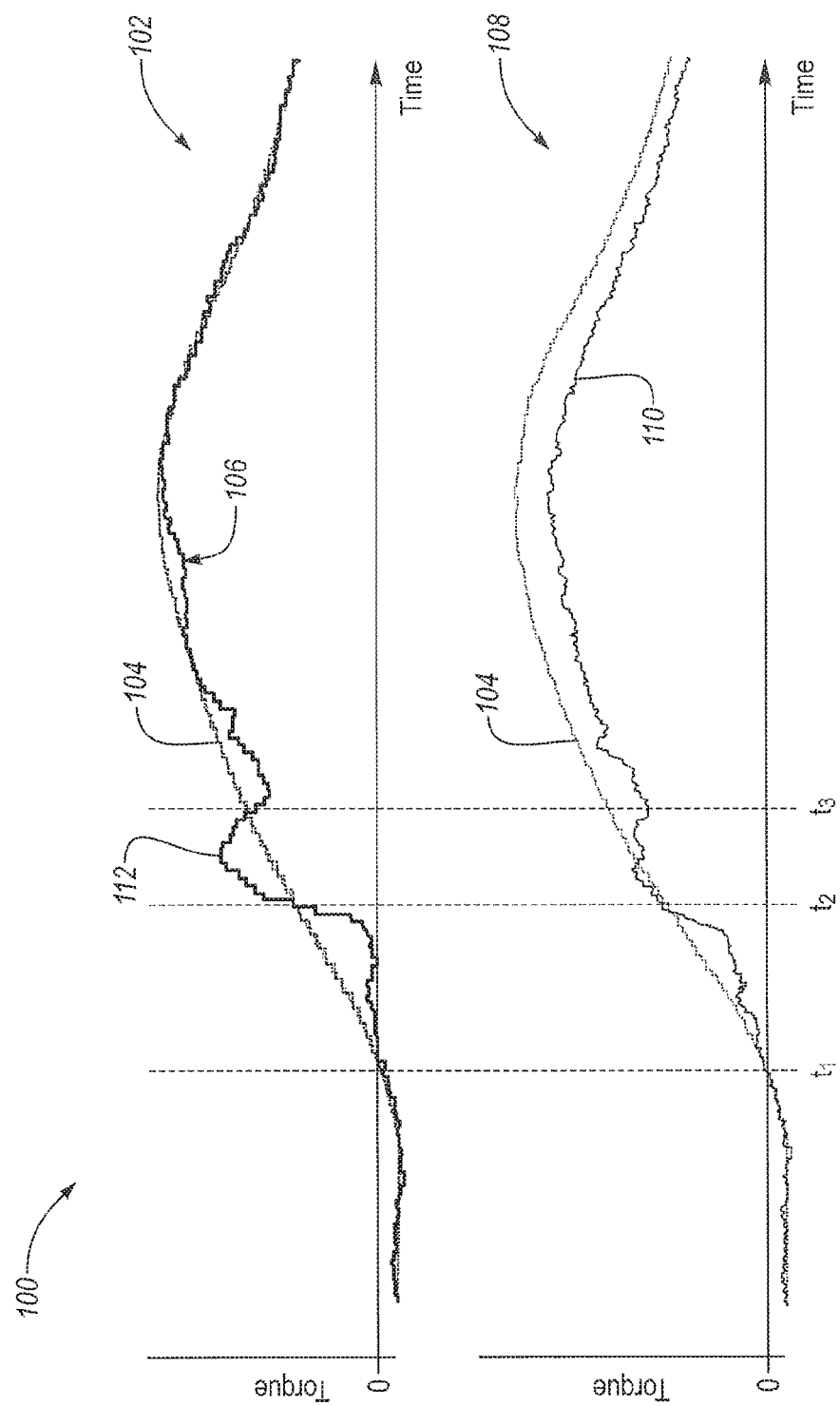
FIG. 3 is a representative graph illustrating wheel torque and motor torque in the absence of a lash mitigation strategy.

Referring to FIG. 3, a representative graph 100 of wheel torque (i.e., the torque at the wheels 40) and motor torque (i.e., the torque of the motor 46) in the absence of a lash mitigation strategy is illustrated. The torque values (both wheel and motor torque values) may be measured at the location of the motor 46 or at the location of the wheels 40 taking into account the gear ratios through the powertrain. The first plot 102 on the graph 100 depicts a desired wheel torque plotted against time and a measured wheel torque plotted against time. The desired wheel torque is represented by line 104 while the measured wheel torque is represented by line 106. The desired wheel torque 104 may also be referred to as the requested wheel torque or the target wheel torque. The measured wheel torque 106 may also be referred to as an actual wheel torque or an estimated wheel torque. The desired wheel torque 104 and the measured wheel torque 106 may be calculated and measured at the wheels 40 of the vehicle, respectively. The second plot 108 on the graph 100 also depicts the desired wheel torque 104 plotted against time. The second plot additionally depicts a measured motor torque plotted against time. The measured motor torque is represented by line 110. The measured motor torque 110 may also be referred to as an actual motor torque or an estimated motor torque. The measured motor torque 110 may be measured at the motor 46 and scaled to take into account the gear ratio that may exist between the motor 46 and the wheels 40.

FIG. 3 depicts a tip-in, where desired wheel torque 104 changes direction from a negative value to positive value. This may occur when the driver of the vehicle depresses the accelerator pedal during a period of deceleration. At time $t_1$, the desired wheel torque 104, measured wheel torque 106, and measured motor torque 110 each change from negative torque values to positive torque values and lash crossing begins. In the absence of a lash mitigation strategy, the measured wheel torque 106 suddenly overshoots the desired wheel torque 104, which is demonstrated by the peak 112 in the measured wheel torque 106 that occurs between time $t_2$ and time $t_3$. The overshoot corresponds to a clunk or a bump felt by the driver, and coincides with the drivetrain components abruptly slowing down when the couplings re-engage after having taken up lash. The sudden loss of kinetic energy in the rotating components is transmitted to the wheels 40 as a torque disturbance. The drivetrain components absorb kinetic energy and are accelerated during lash crossing and drivetrain torque is not transmitted to the wheels 40 when lash is present. Although FIG. 3 is representative of a tip-in, it should be understood that a torque disturbance may occur in the same manner, but in the opposite direction, as described above during a lash crossing where wheel torque changes direction from a positive value to a negative value. For example, a torque disturbance may occur during lash crossing after a tip-out (which may occur when the driver releases the accelerator pedal) or during a brake application. A brake application may include braking that is occurring via friction brakes or via regenerative braking.

Figure 4:
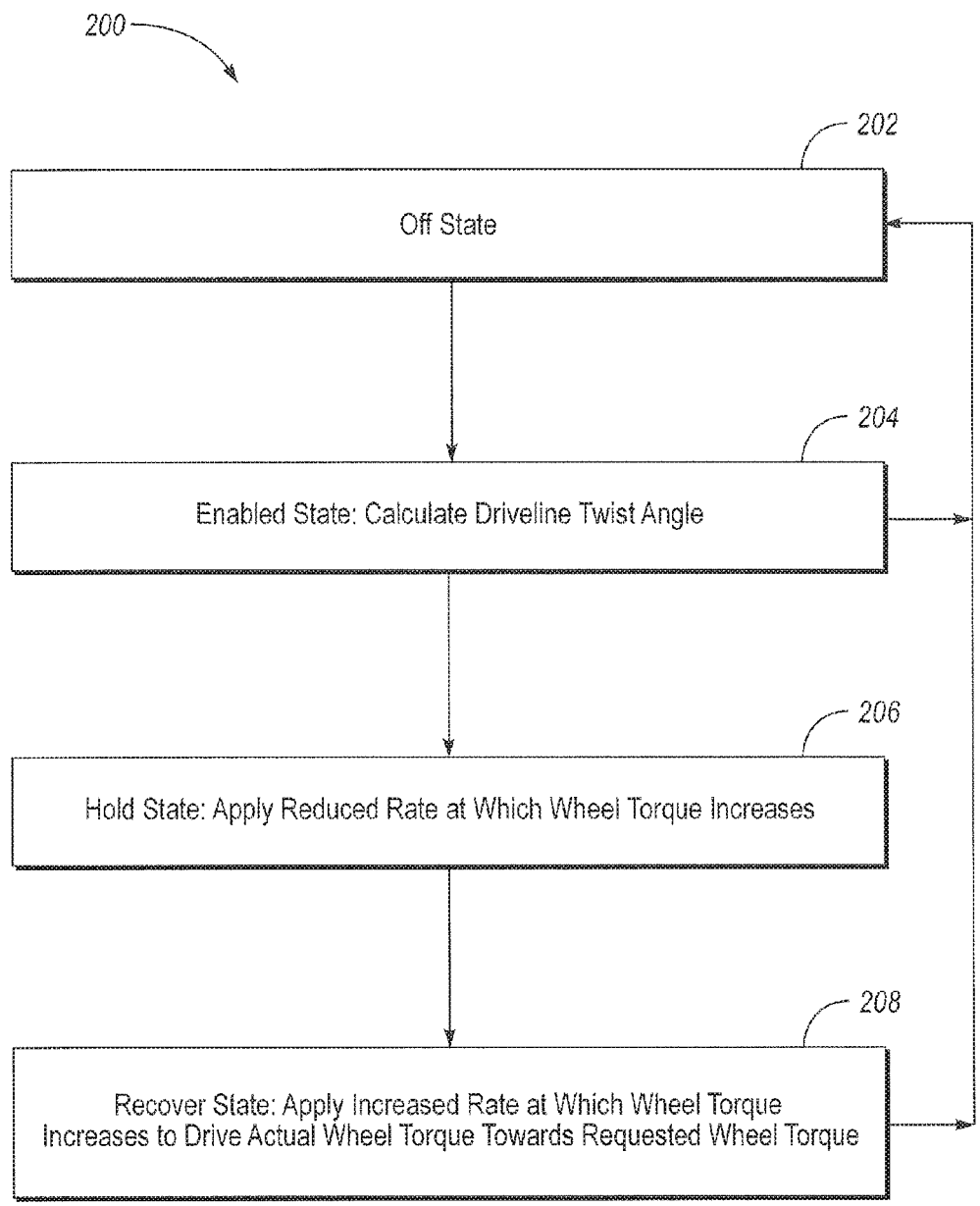
FIG. 4 is a flowchart illustrating a lash mitigation strategy or method for a hybrid vehicle.

Referring to FIG. 4, a lash mitigation strategy or method 200 for a hybrid vehicle drivetrain is illustrated in the form of a flowchart. The lash mitigation strategy is applied during a period after the drivetrain torque has changed direction and while the drivetrain torque and a twist angle in the drivetrain are both increasing. The method 200 and the various steps of the method may be stored in the form of control logic or algorithms that are stored in the memory of and may be implemented by the controller 10. The lash mitigation strategy or method 200 begins in an off state at block 202. As the desired wheel torque of the vehicle approaches zero, the method 200 will transition to an enabled state at block 204. The desired wheel torque approaching zero may be an indication that the torque request in the powertrain is changing direction (e.g., form positive to negative or vice versa). The method 200 may be configured to transition to the enabled state at zero torque or at a calibrated or threshold value that is slightly greater than zero or slightly less than zero. The threshold value may have a value that ranges between +30 Nm and −30 Nm.

Once the method 200 has transitioned to the enabled state at block 204, the method 200 also begins to calculate the twist angle within the drivetrain at block 204. The twist angle represents the total amount of angular free play associated with the lash in the drivetrain. The twist angle may be based on a drivetrain speed difference (e.g., a difference in angular speeds between different components within the drivetrain or powertrain). Specifically, the twist angle may be based on the difference between the angular speeds of the motor 46 and the wheels 40. More, specifically, the twist angle may calculated by integrating the difference between the angular speeds of the motor 46 and the wheels 40. The twist angle calculation may include adjusting one of the angular speeds of the motor 46 or the wheels 40 to account for any gear ratio that may exist between the motor 46 and the wheels 40.

Once the twist angle exceeds an entry threshold value or the difference in angular speeds between different components within the drivetrain or powertrain falls outside of a predetermined range, the method 200 enters a hold state at block 206 and applies a slow or reduced rate at which wheel torque increases to limit measured or actual wheel torque such that the measured or actual wheel torque is less than the desired or requested wheel torque. The entry threshold value may range from 0.037 to 0.113 radians. If the twist angle does not exceed the entry threshold or is fluctuating within a close range of zero torque, block 204 may include a hysteresis function or a time out function that returns the method to the off state at block 202. During the hold state occurring at block 206, the reduced rate at which wheel torque increases allows the components of the drivetrain to gently cross a lashing region to reduce any NVH issues that may occur in the absence of a lash mitigation strategy.

Once the twist angle exceeds an exit threshold value or the difference in angular speeds between different components within the drivetrain or powertrain falls outside of the predetermined range, it is determined that the lashing region has been crossed and the method 200 enters a recover state at block 208. The exit threshold value may range from 0.45 to 0.65 radians. Alternatively, the method 200 may enter the recover state at block 208 prior to the twist angle exceeding the exit threshold value or the difference in angular speeds between different components within the drivetrain or powertrain falling outside of the predetermined range due to the occurrence of an exit event. The exit event may be a tip-in, tip-out, or braking request that includes a torque request that exceeds a torque request threshold. The torque request threshold may have a value that ranges between 1000 Nm and 2000 Nm. The exit event may also be an angular speed difference between the motor 46 and the wheels 40 dropping below a calibrated or threshold value, or a time out function indicating that an excessive amount of time has passed after the twist angle has exceeded the entry threshold but prior to exceeding the exit threshold. The time out function may range between 250 ms and 750 ms. During the recover state at block 208, the rate at which wheel torque increases is increased to a rate that is greater than the rate at which torque was increased during the hold state to drive the measured or actual wheel torque toward the value of the desired or requested wheel torque.

Under certain circumstances, the method 200 may lead to torque modifications or delays in delivering torque to the wheels that may negatively affect drivability. Under these certain circumstances, it may be desirable to entirely disable the method. The disabling circumstances may include tip-ins, tip-outs, or brake applications that include a torque demand that is above a threshold or a vehicle speed being above a threshold. A disabling torque demand threshold may have a value that ranges between 1000 Nm and 2000 Nm. A disabling vehicle speed threshold may have a value that ranges between 30 mph and 50 mph.

It should be understood that the method 200 may be applied when wheel torque is transitioning from positive to negative or vice versa and therefore, any of the steps or calculations that were described with respect to the method 200 should be viewed in terms of absolute values to account for a positive to negative direction change. For example, at block 206 the slow or reduced rate at which torque increases may include a negative torque that is further decreasing in negative value.

Figure 5:
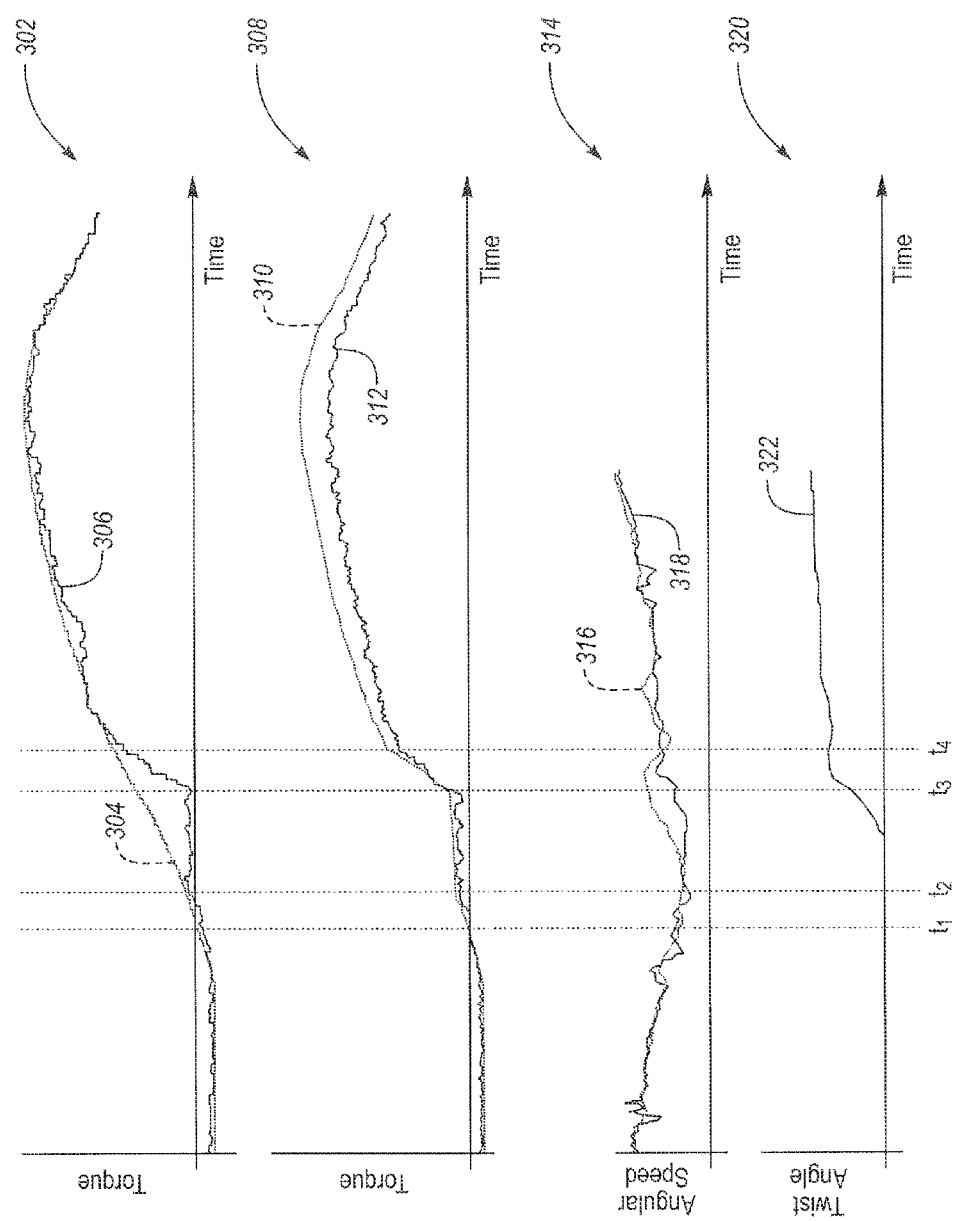
FIG. 5 is a representative graph illustrating wheel torque, motor torque, wheel speed, motor speed, and twist angle, during an application of the lash mitigation strategy.

Referring to FIG. 5, a representative graph 300 of wheel torque, motor torque, wheel speed, motor speed, and twist angle, during an application the lash mitigation strategy or method 200 is illustrated. The first plot 302 on the graph depicts a desired wheel torque that is not altered by the lash mitigation strategy plotted against time and a measured wheel torque plotted against time. The desired wheel torque that is not altered by the lash mitigation strategy is represented by line 304 while the measured wheel torque is represented by line 306. The non-altered desired wheel torque 304 may also be referred to as a requested wheel torque or the target wheel torque. The measured wheel torque 306 may also be referred to as an actual wheel torque or an estimated wheel torque. The non-altered desired wheel torque 304 and the measured wheel torque 306 may be calculated and measured at the wheels 40 of the vehicle, respectively. The second plot 308 on the graph 300 depicts the desired wheel torque altered by the lash mitigation strategy 310 plotted against time and a measured motor torque plotted against time. The measured motor torque is represented by line 312. The altered desired wheel torque 310 may also be referred to as a requested wheel torque or the target wheel torque. The measured motor torque 312 may also be referred to as an actual motor torque or an estimated motor torque. The altered desired wheel torque 310 may be calculated at the wheels 40 of the vehicle, while the measured motor torque 312 may be measured at the motor 46 and scaled to take into account the gear ratio that may exist between the motor 46 and the wheels 40.

The third plot 314 on the graph 300 depicts the angular speed of the motor 46 and the angular speed of the wheels 40 plotted against time, where one of the angular speeds of the motor 46 or the wheels 40 may be adjusted to account for any gear ratio that may exist between the motor 46 and the wheels 40. The angular speed of the motor 46 is represented by line 316 and the angular speed of the wheels 40 is represented by line 318. The fourth plot 320 on the graph depicts the twist angle of the drivetrain plotted against time. The twist angle of the drivetrain is represented by line 322.

FIG. 5 depicts a tip-in, where desired wheel torque changes direction from a negative value to positive value. This may occur when the driver of the vehicle depresses the accelerator pedal during a period of deceleration. At time $t_1$, the non-altered desired wheel torque 304, measured wheel torque 306, altered desired wheel torque 310, and measured motor torque 312 each change from negative torque values to positive torque values and lash crossing begins. The torque values changing from negative to positive correspond with the non-altered desired torque 304 crossing a threshold value where the method 200 begins to calculate the twist angle. Once the twist angle exceeds the entry threshold at time $t_2$, the method 200 applies the slow or reduced rate at which measured wheel torque 306 and measure motor torque 312 increase, to limit measured wheel torque 306 and measured motor torque 312 such that each are less than the non-altered desired wheel torque 304. During this period after time $t_2$, the measured wheel torque 306 and measured motor torque 312 may each be driven toward the altered desired wheel torque 310. Next, once the twist angle exceeds the exit threshold or the difference in angular speeds between different components within the drivetrain or powertrain falls outside of the predetermined range at time $t_3$, the method 200 increases or accelerates the rate at which measured wheel torque 306 and measured motor torque 312 are increased to drive the measured wheel torque 306 and measured motor torque 312 toward the non-altered desired wheel torque 304. The measured wheel torque 306, altered desired wheel torque 310, and measured motor torque 312 each converge approximately with the non-altered desired wheel torque 304 at time $t_4$. The non-altered desired wheel torque 304 and the altered desired wheel torque 310 should be equal in value, except during the time period between $t_2$ and $t_4$. The measured motor torque 312 is shown to be less than the non-altered desired wheel torque 304 and the altered desired wheel torque 310 after time $t_4$. This may be caused by additional power sources (e.g., the engine 16 or the generator 50) providing power to the drivetrain. It should be understood however, that after time $t_4$, the motor 46 may be providing torque to the powertrain at a value other than shown on the graph. For example, the motor 46 may supply all, some, none of the power to obtain the non-altered desired wheel torque 304.

FIG. 5 is representative of a tip-in, it should be understood that the torque mitigation strategy or method 200 may be applied in the same manner, but in the opposite direction, as described above during a lash crossing where wheel torque changes direction from a positive value to a negative value. For example, the method 200 may be applied during lash crossing after a tip-out (which may occur when the driver releases the accelerator pedal) or during a brake application. A brake application may include braking that is occurring via friction brakes or via regenerative braking.

It should be understood that the vehicle configuration described herein is merely exemplary and is not intended to be limited. Other hybrid, electric, and non-hybrid vehicle configurations should be construed as disclosed herein. The other vehicle configurations should include, but are not limited to, vehicles only having an internal combustion engine, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A drivetrain system comprising:
a controller programmed to, in a presence of a request for increased drivetrain torque that results in reversal of drivetrain torque direction, command an increase in drivetrain torque at a reduced rate while a value that is based on drivetrain speed difference remains within a predetermined range absent a braking torque request exceeding a threshold, and command the increase at an accelerated rate upon the braking torque request exceeding the threshold.

2. The system of claim 1, wherein the controller is further programmed to command the increase at the accelerated rate upon the request for increased drivetrain torque exceeding a torque request threshold.

3. The system of claim 1, wherein the controller is further programmed to command the increase at the accelerated rate upon the expiration of a predefined time limit while the value remains within the predetermined range.

4. The system of claim 1, wherein the drivetrain speed difference is a difference in speed between an electric machine and a drive wheel.

5. The system of claim 4, wherein the value is based on an integral of the difference in speed between the electric machine and the drive wheel.

6. A controller comprising:
input channels configured to receive parameters indicative of drivetrain speed difference and requests for drivetrain torque;
output channels configured to provide commands to increase drivetrain torque; and
control logic programmed to, in a presence of a request for increased drivetrain torque that results in reversal of drivetrain torque direction, generate a command to increase drivetrain torque at a reduced rate so long as a value that is based on drivetrain speed difference remains within a predetermined range absent the request for increased drivetrain torque exceeding a threshold, and generate a command to increase drivetrain torque at an accelerated rate upon the request for increased drivetrain torque exceeding the threshold.

7. The controller of claim 6, wherein the control logic is further programmed to, in response to a braking torque request exceeding a braking torque threshold, generate the command to increase drivetrain torque at the accelerated rate.

8. The controller of claim 6, wherein the control logic is further programmed to, upon expiration of a predefined time limit while the value remains within the predetermined range, generate the command to increase drivetrain torque at the accelerated rate.

9. The controller of claim 6, wherein the drivetrain speed difference is a difference in speed between an electric machine and a drive wheel.

10. The controller of claim 9, wherein the value is based on an integral of the difference in speed between the electric machine and the drive wheel.

11. A vehicle comprising:
a drivetrain; and
a controller programmed to, in response to a request for increased drivetrain torque resulting in a reversal of drivetrain torque direction,
increase the drivetrain torque at a reduced rate while a value that is based on drivetrain speed difference remains within a predetermined range, and
increase the drivetrain torque at an accelerated rate upon expiration of a predefined time limit while the value remains within the predetermined range.

12. The vehicle of claim 11, wherein the controller is further programmed to increase the drivetrain torque at the accelerated rate upon the request for increased drivetrain torque exceeding a torque request threshold.

13. The vehicle of claim 11, wherein the controller is further programmed increase the drivetrain torque at the accelerated rate upon a braking torque request exceeding a braking torque threshold.

14. The vehicle of claim 11, wherein the drivetrain speed difference is a difference in speed between an electric machine and a drive wheel.

15. The vehicle of claim 14, wherein the value is based on an integral of the difference in speed between the electric machine and the drive wheel.

\* \* \* \* \*